United States Patent [19]

Deriaz

[11] Patent Number: 5,580,327
[45] Date of Patent: Dec. 3, 1996

[54] HOLLOW WHEEL FOR A SUN-AND-PLANET TOOTHED WHEEL GEARING

[75] Inventor: Marc Deriaz, Meilen, Switzerland

[73] Assignee: Ernst Grob AB, Switzerland

[21] Appl. No.: 501,467

[22] Filed: Jul. 12, 1995

[30] Foreign Application Priority Data

Jul. 30, 1994 [EP] European Pat. Off. ........... 9411194

[51] Int. Cl.⁶ .................... F16H 55/08; F16H 55/17; F16H 1/28
[52] U.S. Cl. ............................................. 475/344
[58] Field of Search ................ 475/344; 74/435, 74/460

[56] References Cited

U.S. PATENT DOCUMENTS

| | | | |
|---|---|---|---|
| 716,881 | 12/1902 | Foccart | 74/460 |
| 2,888,833 | 6/1959 | Toderick | 74/435 |
| 3,015,973 | 1/1962 | Doerries . | |

OTHER PUBLICATIONS

Engineers' Illustrated Thesaurus, H. Herkimer, Chemical Publishing Co., Inc. 1952, pp. 178–179.

*Primary Examiner*—Dirk Wright
*Attorney, Agent, or Firm*—Laurence R. Brown

[57] ABSTRACT

In a sun-and-planet toothed wheel gearing the width of the tooth spaces of the toothing of the hollow wheel is preferably made three times larger than at a common toothing with substantially the identical widths of the teeth and tooth spaces. Such a inventive toothing can be produced specifically simple and precise by means of non-cutting methods, preferably an impact rolling.

6 Claims, 1 Drawing Sheet

HOLLOW WHEEL FOR A SUN-AND-PLANET TOOTHED WHEEL GEARING

BACKGROUND OF THE INVENTION

1. Field of The Invention

The present invention relates to a hollow wheel for a sun-and-planet toothed wheel gearing having a toothed sun wheel, a toothed hollow wheel and at least one toothed planet wheel.

2. Description of The Prior Art

In order to realize large gear ratios of rotating shafts in a as small as possible space it is common practice to often apply a sun-and-planet wheel gearing. Thereby, usually a sun wheel, three planet wheels and one hollow wheel are brought to mesh in an axially parallel state. The sun wheel and the planet wheels are thereby conventional gear wheels having an outer toothing while the hollow wheel has an inner toothing.

Specifically the production of hollow wheels with an inner toothing poses some problems. If such hollow wheels are to be produced in large numbers the conventional cutting or machining, resp. operations such as reaming or slotting involve to high costs and are also too slow. If, however, at the same time a high precision and rigidity at as low as possible cost are demanded, molding or injection molding methods can not be considered, either. As a non-cutting working a rolling or pressing could be chosen. But these methods regarding the precision of the shaping of the toothing of hollow wheels also meet their limits.

SUMMARY OF THE INVENTION

Thus, it is a general object of the present invention to provide a hollow wheel for a sun-and-planet wheel gearing which is specifically suitable to be produced at a high precision by a non-cutting method.

A further object is to provide a hollow wheel for a sun-and-planet wheel gearing in which the ratio of overlap of the toothing between the toothed hollow wheel and the at least one toothed planet wheel equals or is only slightly larger than the ratio of overlap of the toothing between the toothed sun wheel and the at least one toothed planet gear.

Thus, the ratio of overlap of the toothing of the hollow wheel and the at least one planet wheel shall correspond about to the ratio of overlap between the sun wheel and planet wheels or shall be larger. It has surprisingly been found that this inventive design of the toothing of the hollow wheel, i.e. by an enlarging of the width of the tooth space relative to the tooth width as such does not lead to an adverse influence in the transmission, transmitting of the force or reliability of the transmission gearing. The advantage of such an inventive toothing is now that the width of the tooth space is preferably trebled in comparison with the width of a conventional toothing. Therefore, the toothing can be realized specifically by a non-cutting method of production, preferably by an impact rolling, in a simple manner and specifically also with a high precision.

BRIEF DESCRIPTION OF THE DRAWINGS

The present invention will be better understood and objects other than those set forth above will become apparent when consideration is given to the following detailed description thereof when read in conjunction with the appended drawings, in which.

DETAILED DESCRIPTION OF THE PREFERRED EMBODIMENT

Figure 1:
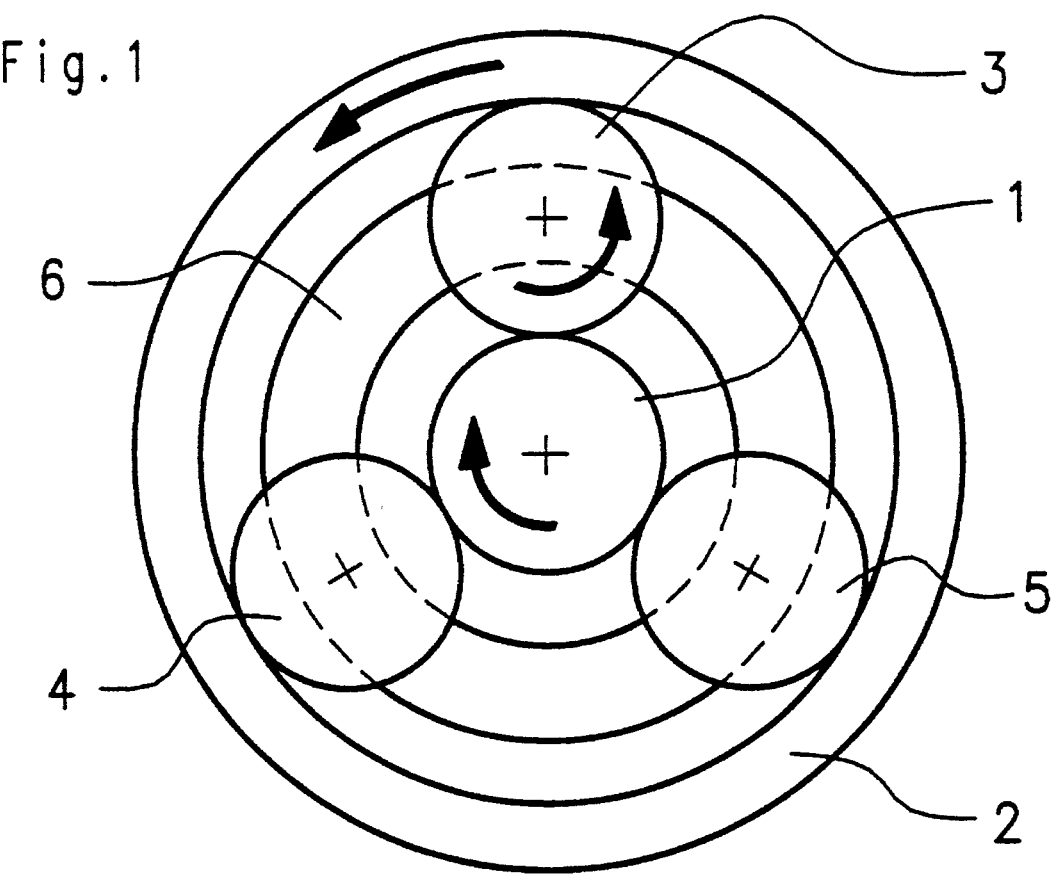
FIG. 1 illustrates a schematic cross-section through a conventional sun-and-planet wheel gearing.

FIG. 1 illustrates schematically the structure of a sun-and-planet wheel gearing having a sun wheel 1, a hollow wheel 2 and for instance three planet wheels 3,4,5. The planet wheels are mounted by a rotatable bearing on the stationary or rotatable planet wheel carrier. The toothing of the gear wheels 1,2,3,4,5 is not specifically illustrated in this schematic drawing. It is, however, conventional that the sun wheel and the planet wheels 3,4,5, as well, comprise an outer toothing and also the hollow wheel 2 an inner toothing with substantially identical tooth widths and tooth spaces.

Such as can already be seen in this FIG. 1, the overlap of the toothing between the hollow wheel 2 and the planet wheels 3,4,5 is larger than the overlap of the toothing between the planet wheels 3,4,5 and the sun wheel. This means that usually a plurality of the teeth of the hollow wheel 2 and the planet wheels 3,4,5 mest simultaneously, while between the planet wheels 3,4,5 and the sun wheel at least one respective pair of teeth mesh.

Figure 2:
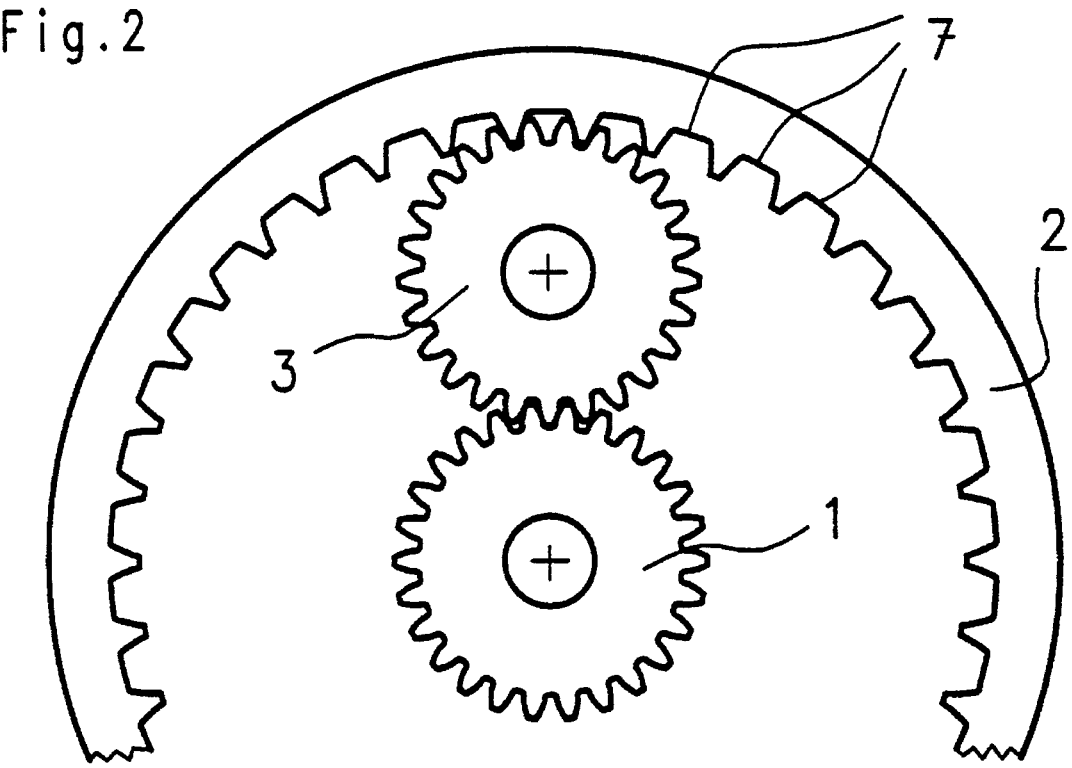
FIG. 2 illustrates schematically a toothing of the hollow wheel of a sun-and-planet wheel gearing structured in accordance with the present invention.

It is now proposed in accordance with the invention to delete at the hollow wheel 2 preferably every second tooth of a conventional toothing such as illustrated in FIG. 2. The conventional number of teeth of the hollow wheel 2 must, thereby, be even-numbered in order to arrive at an equal distribution of the tooth spaces 7 in the toothing of the hollow wheel. By means of this measure the width of the tooth spaces 7 is about trebled relative to the conventional width of tooth spaces. By selecting the ratio of overlap between the toothing of the hollow wheel 2 and the planet wheel 3 to be of the same magnitude as the ratio of overlap between the sun wheel 1 and the planet wheel 3, which generally is selected to be about one or slightly larger, it is arrived at, that in spite of the tooth spaces 7 present, always at least one pair of teeth meshes, i.e. that the overlap is larger than or equal 1. Therefore, regarding the behavior of the toothing during its operating no drawbacks must be suffered. Because the toothing must be dimensioned based on the transmission of force between sun wheel 1 and planet wheel 2, the loading capability of the toothing does not worsen either.

The advantage of this tooth spacing 7 which is increased in relation to the tooth width at the hollow wheel 2 is that the producing of the toothing of the hollow wheel 2 specifically by non-cutting methods such as pressing and rolling is now more simple, that is that now finally a high precision and a sufficient rigidity, as well can be achieved. It can easily been seen that such a hollow wheel 2 can be produced also more easily by cutting methods such as for instance by reaming in that the removing of the cuttings or chips, resp. is improved is improved due to a larger space available.

The problem in the production of conventional toothings by a cold working was among others due to the fact that the stencil to be used inside of the raw hollow wheel had to be produced exactly in the shape of the toothing. If now this stencil such as is foreseen for the toothing in accordance with the invention can be designed for broader tooth spaces 7, it can much better take up the rolling or pressing forces because the corresponding teeth of the stencil can be designed in this width and thus are correspondingly more stable.

In FIG. 2 a gear having only one planet wheel 3 is illustrated. Obviously, the inventive toothing of the hollow wheel can be applied also when using three or more planet wheels in the gear.

While there is shown and described one preferred embodiment of the invention, it is distinctly to be understood that the invention is not limited thereto but may be otherwise variously embodied and practiced within the scope of the following claims.

I claim:

1. A hollow wheel for a sun-and-planet toothed wheel gearing having a toothed sun wheel, a toothed hollow wheel and at least one toothed planet wheel, said toothed hollow wheel and said at least one toothed planet wheel featuring a first ratio of overlap between the toothing and said toothed sun wheel and said at least one toothed planet wheel featuring a second ratio of overlap between the toothing, in which the ratio of overlap of the toothing between said toothed hollow wheel and said at least one toothed planet wheel is larger than the ratio of the toothing between said toothed sun wheel and said at least one toothed planet gear in which the toothing of the hollow wheel is produced by a cold working, specifically by an impact rolling operation.

2. A hollow wheel for a sun-and-planet toothed wheel gearing having a toothed sun wheel, a toothed hollow wheel and at least one toothed planet wheel, said toothed hollow wheel and said at least one toothed planet wheel featuring a first ratio of overlap between the toothing and said toothed sun wheel and said at least one toothed planet wheel featuring a second ratio of overlap between the toothing, in which the ratio of overlap of the toothing between said toothed hollow wheel and said at least one toothed planet wheel is larger than the ratio of the toothing between said toothed sun wheel and said at least one toothed planet gear, which hollow wheel has an inner gear with spaces between the teeth, in which the width of tooth space of the inner gear of the hollow wheel is dimensioned in such a manner that only every second tooth of the at least one toothed planet gear engages one tooth of the hollow wheel.

3. A hollow wheel for a sun-and-planet toothed wheel gearing having a toothed sun wheel, a toothed hollow wheel and at Least one toothed planet wheel, said toothed hollow wheel and. Said at least one toothed planet wheel featuring a first ratio of overlap between the toothing and said toothed sun wheel and said at least one toothed planet wheel featuring a second ratio of overlap between the toothing, in which the ratio of overlap of the toothing between said toothed hollow wheel and said at least one toothed planet wheel is larger than the ratio of the toothing between said toothed sun wheel and said at least one toothed planet gear, in which the width of the respective spaces between the teeth of the hollow wheel correspond to three times the respective spaces between the teeth of the at least one toothed planet gear.

4. The hollow wheel of claim 2, in which the shapes of the teeth and the distance between the teeth of the hollow wheel correspond to a general tooth geometry at which each second tooth is omitted.

5. In a sun-and-planet-and-hollow-wheel gear train, the improvement comprising in combination, a toothed planet wheel having substantially equal tooth widths and tooth spaces engaged to drive teeth of a hollow toothed wheel having tooth spaces wide enough for encompassing at least two planet wheel teeth.

6. In a sun-and-planet-and-hollow-wheel gear train, the improvement comprising in combination, toothed sun and planet and hollow wheels connected together in said gear train with the sun and planet wheels having teeth spaced closer together than the teeth on the hollow wheel.

\* \* \* \* \*